(12) United States Patent
Rungta et al.

(10) Patent No.: US 9,124,503 B2
(45) Date of Patent: Sep. 1, 2015

(54) NETWORK CONGESTION MANAGEMENT

(71) Applicant: Intel Corporation, Santa Clara, CA (US)

(72) Inventors: Sanjay Rungta, Phoenix, AZ (US); Dileep K. Basam, Kavali (IN)

(73) Assignee: Intel Corporation, Santa Clara, CA (US)

( * ) Notice: Subject to any disclaimer, the term of this patent is extended or adjusted under 35 U.S.C. 154(b) by 108 days.

(21) Appl. No.: 13/826,077

(22) Filed: Mar. 14, 2013

(65) Prior Publication Data

US 2014/0269301 A1    Sep. 18, 2014

(51) Int. Cl.
*H04L 12/70* (2013.01)
*H04L 12/801* (2013.01)

(52) U.S. Cl.
CPC ..................................... *H04L 47/12* (2013.01)

(58) Field of Classification Search
None
See application file for complete search history.

(56) References Cited

U.S. PATENT DOCUMENTS

| 2010/0165840 | A1  | 7/2010 | Khan et al. |         |
|--------------|-----|--------|-------------|---------|
| 2011/0141904 | A1* | 6/2011 | Viger et al. | 370/241 |
| 2013/0021968 | A1* | 1/2013 | Reznik et al. | 370/328 |

OTHER PUBLICATIONS

Lu et al., "Congestion Control in Networks with No Congestion Drops," Proceedings of the 44th Allerton Conference on Communication, Control and Computing, Sep. 2006, 8 pages.
"Network Congestion," Wikipedia, The Free Encyclopedia, Aug. 31, 2012, web page available at: <http://en.wikipedia.org/w/index.php?oldid=549593681>, 8 pages.
"Congestion Window," Wikipedia, The Free Encyclopedia, Apr. 2013, web page available at: <http://en.wikipedia.org/w/index.php?title=Congestion_window&oldid=510072808>, 1 page.
Allman et al., "RFC 5681: TCP Congestion Control," Sep. 2009, 18 pages.

* cited by examiner

*Primary Examiner* — John Blanton
*Assistant Examiner* — Alan Lindenbaum
(74) *Attorney, Agent, or Firm* — Barnes & Thornburg LLP

(57) ABSTRACT

Technologies for managing congestion of a communication channel includes a network device for receiving a network packet from a computing device destined for another computing device, analyzing network traffic flows over a communication channel established between the network device and an upstream network device, and determining whether the communication channel is congested as a function of the network traffic flows. Such technologies may also include storing the received packet in a local storage in response to determining that the communication channel is congested, transmitting an acknowledgement packet to the computing device in response to storing the received network packet local storage, and transmitting the stored network packet to the upstream network device in response to determining that the communication channel is no longer congested.

23 Claims, 4 Drawing Sheets

9,124,503 B2

NETWORK CONGESTION MANAGEMENT

BACKGROUND

Modern computing devices are becoming ubiquitous tools for personal, business, and social uses. As a result, the computer networks over which those computing devices communicate are being required to handle an ever-increasing amount of traffic. Due to that increased demand, it is not uncommon for one or more communication channels of a computer network to become temporarily congested with traffic. During periods of congestion, one or more network packets being transmitted from one computing device to another computing device may be lost. Such packet loss often results in the computing device having to retransmit the lost network packets, which may further add to the congestion.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
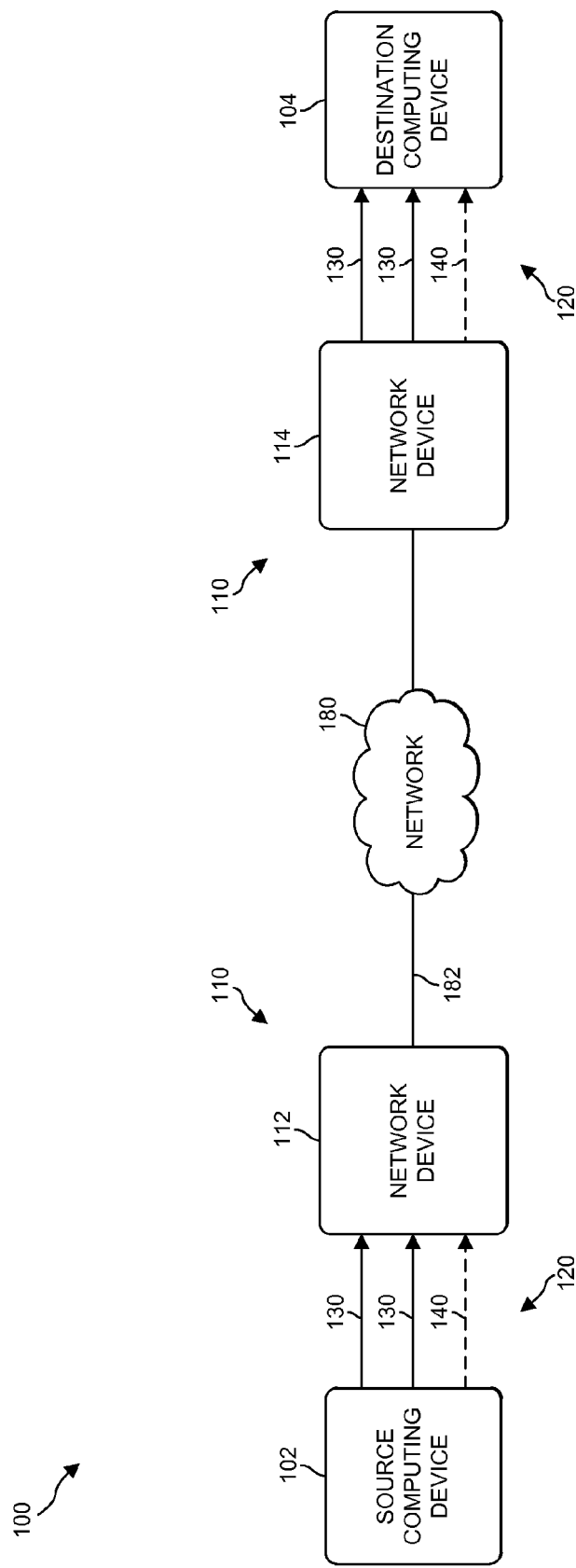
FIG. 1 is a simplified block diagram of at least one embodiment of a system for managing congestion of a network communication channel.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for managing congestion of a network communication channel includes one or more network devices 110 (e.g., a network device 112 and an upstream network device 114), a source computing device 102, a destination computing device 104, and a network 180. In use, one or more network connections (e.g., network traffic flows 120) may be established over the network 180 between the source computing device 102 and the destination computing device 104. Each of the network traffic flows may include one or more data packets generated by the source computing device 102 and destined for the destination computing device 104. In some embodiments, the one or more network devices 110 are configured to facilitate transmitting one or more of the data packets generated by the source computing device 102 to the destination computing device 104. For example, in the illustrative embodiment shown in FIG. 1, the network device 112 may receive one or more data packets from the source computing device 102 and then forward those packets to the upstream network device 114 for transmission to the destination computing device 104. In some embodiments, the network device 112 is configured to forward those packets to the upstream network device 114 over a communication channel 182 established between the network device 112 and the upstream network device 114.

In some embodiments, the network device 112 is also configured to determine whether the communication channel 182 established with the upstream network device 114 is congested. To do so, the network device 112 may monitor one or more network traffic flows 120 over the communication channel 182 established between the network device 112 and the upstream network device 114. For example, in some embodiments, the network device 112 may monitor one or more existing network traffic flows 130 over the communication channel 182. In such embodiments, the network device 112 may determine whether the communication channel 182 is congested (e.g., saturated, at capacity, etc.) based at least in part on, or otherwise as a function of, one or more network packets corresponding to the existing network traffic flows 130.

As discussed in more detail below, the network device 112 may store network packets corresponding to a new network traffic flow 140 over the communication channel 182 in response to determining that the communication channel 182 is congested. In some embodiments, the new network traffic flow 140 may correspond to a new connection established between the source computing device 102 and the destination computing device 104 over the network 180. In such embodiments, in order to facilitate preserving the new network connection (e.g., the new network traffic flow 140 that is being stored), the network device 112 may transmit an acknowledgement packet and/or message to the source computing device 102 for each network packet stored for the new network traffic flow 140. To do so, the network device 112 may spoof or otherwise impersonate the destination computing device 104 such that the source computing device 102 believes that the acknowledgement packets are originating from the destination computing device 104 rather than the network device 112. At the same or a substantially similar time, the network device 112 may transmit a keep-alive packet to one or more of the upstream network device 114, other network devices 110, and/or directly to the destination computing device 104. As a result, the destination computing device 104 and/or one or more applications executing on the destination computing device 104 may believe that the new network connection (e.g., the new network traffic flow 140) is still active, which may facilitate preventing the destination computing device 104 and/or one or more applications executing on the destination computing device 104 from unilaterally closing/terminating the new network connection.

After a reference amount of time, the network device 112 may determine that the communication channel 182 is no longer congested and, as a result, may retrieve and replay or otherwise forward the stored network packets to the upstream network device 114 for subsequent delivery to the destination computing device 104. In doing so, the network device 112 may spoof or otherwise impersonate the source computing device 102 such that the upstream network device 114 and/or the destination computing device 104 believe that the replayed network packets are originating from the source computing device 102 rather than the network device 112. Additionally, the network device 112 may intercept and drop or otherwise discard acknowledgement packets and/or messages received from the upstream network device 114 or the destination computing device 104. In doing so, the network device 112 may facilitate preventing the source computing device 102 from receiving acknowledgement packets corresponding to replayed network packets.

Figure 2:
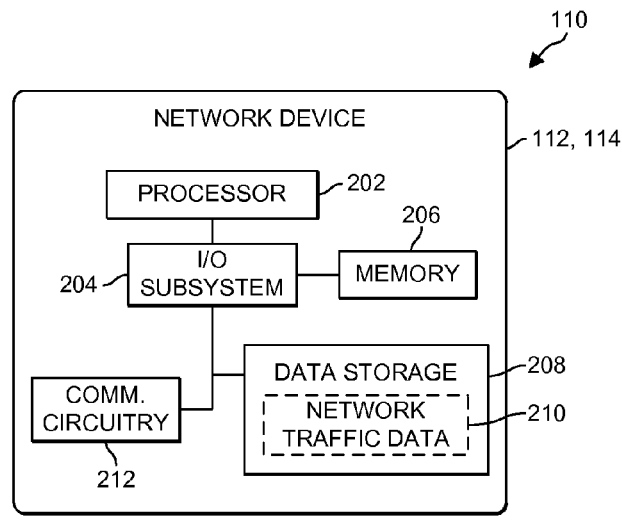
FIG. 2 is a simplified block diagram of at least one embodiment the network device(s) of the system of FIG. 1.

It should be appreciated that by storing data packets associated with the newly established network traffic flow 140, acknowledging the receipt of the stored data packets from the source computing device 102, and later replaying the stored data packets to the upstream network device 114 and/or the destination computing device 104, the network device 112 may preserve the newly established network traffic flow 140 and prevent the data packets associated with the newly established network traffic flow 140 from contributing to congestion of the communication channel 182. For example, in some embodiments, the number of network packets lost and/or the number of network packets needing to be retransmitted may be reduced Each of the network devices 110 (e.g., the network device 112 and the upstream network device 114) may be embodied as any type of networking device capable of performing the functions described herein including, a network router, a network switch, a network hub, a wireless access point, a desktop computer, a laptop computer, and/or any other type of networking or computing device. As shown in FIG. 2, each of the illustrative network devices 112, 114 includes a processor 202, a memory 206, an input/output (I/O) subsystem 204, a data storage 208, and communication circuitry 212. Of course, the network devices 112, 114 may include other or additional components, such as those commonly found in a networking and/or computing device (e.g., various input/output devices), in other embodiments. Additionally, in some embodiments, one or more of the illustrative components may be incorporated in, or otherwise from a portion of, another component. For example, the memory 206, or portions thereof, may be incorporated in the processor 202 in some embodiments.

The processor 202 may be embodied as any type of processor capable of performing the functions described herein. For example, the processor 202 may be embodied as a single or multi-core processor(s), digital signal processor, microcontroller, or other processor or processing/controlling circuit. Similarly, the memory 206 may be embodied as any type of volatile or non-volatile memory or data storage capable of performing the functions described herein. In operation, the memory 206 may store various data and software used during operation of the network devices 112, 114 such as operating systems, applications, programs, libraries, and drivers. The memory 206 is communicatively coupled to the processor 202 via the I/O subsystem 204, which may be embodied as circuitry and/or components to facilitate input/output operations with the processor 202, the memory 206, and other components of the network devices 112, 114. For example, the I/O subsystem 204 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 204 may form a portion of a system-on-a-chip (SoC) and be incorporated, along with the processor 202, the memory 206, and other components of the network devices 112, 114, on a single integrated circuit chip.

The data storage 208 may be embodied as any type of device or devices configured for short-term or long-term storage of data such as, for example, memory devices and circuits, memory cards, hard disk drives, solid-state drives, or other data storage devices. In some embodiments, the data storage 208 may be configured to store network traffic data 210. As discussed in more detail below, the network traffic data 210 may include one or more network packets associated with a new network traffic flow 140 over the communication channel 182 established between one or more of the network devices 110 (e.g., the network device 112 and the upstream network device 114). The network traffic data 210 may also include information regarding one or more of the network traffic flows 120. For example, in some embodiments, the network traffic data 210 may include information corresponding to the status (e.g., active, amount of time inactive, etc.) of one or more of the network traffic flows 120. Such information may be stored in one or more tables, files, and/or in any other format suitable for storing traffic flow information.

The communication circuitry 212 of the network devices 112, 114 may be embodied as any communication circuit, device, or collection thereof, capable of enabling communications between the network devices 112, 114 and one or more other network devices 110, the source computing device 102, the destination computing device 104, and/or other computing devices. The communication circuitry 212 may be configured to use any one or more communication technology (e.g., wireless or wired communications) and associated protocols (e.g., Ethernet, Wi-Fi®, WiMAX, etc.) to effect such communication.

Referring back to FIG. 1, the network device 112 communicates, in some embodiments, with one or more of the upstream network device 114, the source computing device 102, the destination computing device 104, and/or other computing devices over the network 180. The network 180 may be embodied as any number of various wired and/or wireless communication networks. For example, the network 180 may be embodied as or otherwise include a local area network (LAN), a wide area network (WAN), a cellular network, or a publicly-accessible, global network such as the Internet. As such, it should be appreciated that the network 180 may also include any number of additional devices to facilitate communication between the network device 112 and one or more of the upstream network device 114, the source computing device 102, the destination computing device 104, and/or the other computing devices.

It should be appreciated that although only one communication channel 182 is established between two network devices 110 (e.g., the network device 112 and the upstream network device 114) in the illustrative embodiment, any number of communication channels may be established between any number of the network devices 110. Additionally, it should be understood that any number of existing network traffic flows 130 and/or new network traffic flows 140 may be established between the source computing device 102 and the destination computing device 104.

Each of the source computing device 102 and the destination computing device 104 may be embodied as any type of computing device for processing, receiving, storing, and communicating data over the network 180. For example, each computing device 102, 104 may be separately embodied as a network device, a desktop computer, a laptop computer, a tablet computer, a "smart" phone, a mobile media device, a game console, a mobile internet device (MID), a personal digital assistant, a "smart" appliance, or other computer and/or computing device. As such, the source computing device 102 and the destination computing device 104 may include various hardware and software components (e.g., a processor, I/O subsystem, memory, and communication circuitry) commonly found in a computing device, which are not shown in FIG. 1 for clarity of the description. In some embodiments, the source computing device 102 may be configured to generate one or more network packets (e.g., data packets) intended for the destination computing device 104. In such embodiments, the source computing device 102 may transmit the one or more network packets to the network device 112, which as discussed in more detail below, may forward those packets to the upstream network device 114 for subsequent transmission to the destination computing device 104. It should be appreciated that although only two computing devices (e.g., the source computing device 102 and the destination computing device 104) are shown in the illustrative embodiment, any number of computing devices may be included in other embodiments. Further, although the terms "source" and "destination" are shown and described with reference to the illustrative computing devices 102, 104 of FIG. 1, communications (e.g., network packets) may be sent between the computing device 102 and the computing device 104 in either direction in other embodiments. That is, in some embodiments, the destination computing device 104 may instead (or additionally) send data packets to the source computing device 102.

Figure 3:
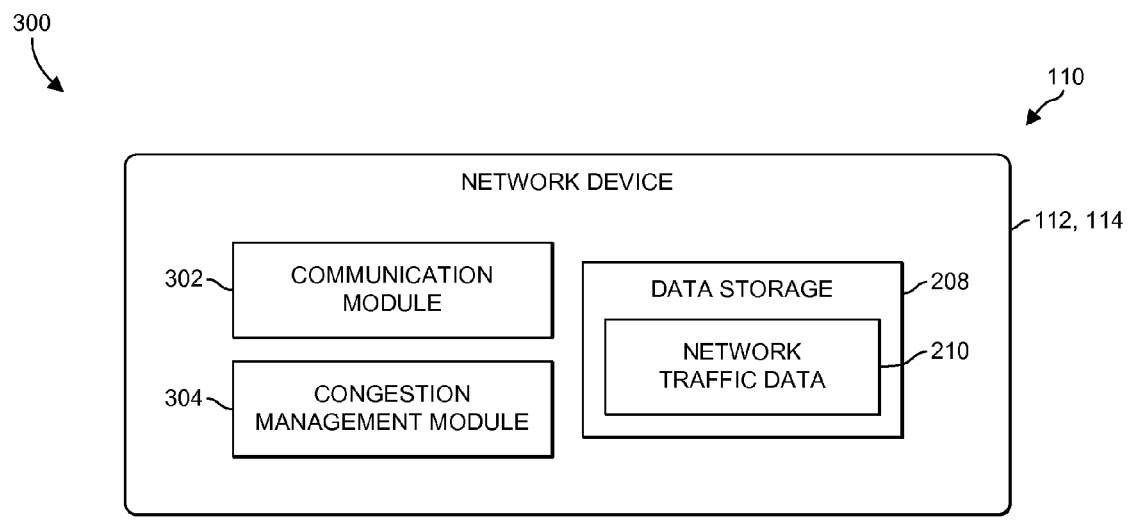
FIG. 3 is a simplified block diagram of at least one embodiment of an environment of the network device(s) of the system of FIG. 1.

Referring now to FIG. 3, in one embodiment, each of the network devices 110 (e.g., the network device 112 and the upstream network device 114) establishes an environment 300 during operation. The illustrative environment 300 includes a communication module 302, congestion management module 304, and the data storage 208, each of which may be embodied as software, firmware, hardware, or a combination thereof. It should be appreciated that each of the network devices 110 (e.g., the network device 112 and the upstream network device 114) may include other components, sub-components, modules, and devices commonly found in a network device, which are not illustrated in FIG. 3 for clarity of the description. Additionally, it should be understood that although each of the network devices 112, 114 may establish the illustrative environment 300 during operation, the following discussion of that illustrative environment 300 is described with specific reference to the network device 112 for clarity of the description.

The communication module 302 facilitates communications between any component and/or sub-component of the network device 112 and one or more of the upstream network device 114, the source computing device 102, the destination computing device 104, and/or other computing devices. For example, the communication module 302 may be configured to receive network packets from the source computing device 102 and forward those packets to the upstream network device 114 for further processing (e.g., subsequent transmission to the destination computing device 104, subsequent transmission to other network devices 110, etc.). Additionally, in some embodiments, the communication module 302 may be configured to receive network packets from the upstream network device 114 and forward those packets to the source computing device 102.

As discussed, the network device 112 may be configured to determine whether the communication channel 182 established between the network device 112 and the upstream network device 114 is congested (e.g., saturated, at capacity, etc.). To do so, the congestion management module 304 is configured to analyze network packets corresponding to one or more existing network traffic flows 130 over the communication channel 182 and determine whether any includes information indicative of the communication channel 182 being congested. For example, in some embodiments, the one or more existing network traffic flows 130 may be embodied as, or otherwise correspond to, one or more transmission control protocol connections over the communication channel 182. In such embodiments, the congestion management module 304 may analyze the header information of the corresponding network packets and determine whether any such header information includes a congestion widow size and/or an explicit congestion notification indicative of the communication channel 182 being congested. In some embodiments, the congestion management module 304 may monitor the number and/or frequency of network packets being lost across the communication channel 182. For example, the congestion management module 304 may keep track of (e.g., log, count, etc.) the number (e.g., quantity, amount, etc.) of network packets being retransmitted over the communication channel 182, the frequency of network packets being retransmitted over the communication channel 182, the number (e.g., quantity, amount, etc.) of duplicate acknowledgements being received over the communication channel 182, and/or the frequency of duplicate acknowledgements being received over the communication channel 182. The congestion management module 304 may thereafter determine that the number and/or frequency of network packets being retransmitted over the communication channel 182, or the number and/or frequency of duplicate acknowledgments being received over the communication channel 182, exceeds a reference amount or frequency. In such embodiments, the congestion management module 304 may determine that the communication channel 182 is congested based on such data. However, it should be appreciated that the congestion management module 304 may use any suitable technology or process for determining that the communication channel 182 is congested (e.g., heartbeats, network latency, packet sniffing, bandwidth monitoring, network interface controller availability, processor utilization, Simple Network Management Protocol messages, etc.).

The congestion management module 304 may also be configured to determine whether network packets corresponding to a new network traffic flow 140 should be transmitted over the communication channel 182 based at least in part on, or otherwise as a function of, determining whether the communication channel 182 is congested. For example, in embodiments wherein it is determined that the communication channel 182 is not congested, network packets corresponding to existing network traffic flows 130 (e.g., previously established traffic flows) as well as those corresponding to new network traffic flows 140, are forwarded or otherwise transmitted unimpeded to the upstream network device 114 over the communication channel 182. Additionally or alternatively, in embodiments wherein it is instead determined that the communication channel 182 is congested, the congestion management module 304 may be configured to enable a network storage mode on the network device 112 for newly received packets corresponding to one or more new network traffic flows 140 being transmitted over the communication channel 182 established between the network device 112 and the upstream network device 114. As discussed in more detail below, the congestion management module 304 may store the newly received packets corresponding to the one or more new network traffic flows 140 during periods that the communication channel 182 is congested and the network storage mode has been enabled. Additionally, during periods in which the network storage mode is enabled, the congestion management module 304 may also be configured to generate and transmit acknowledgement packets and/or keep-alive packets to one or more network devices 110 and/or computing devices further upstream or downstream from the network device 112 to preserve the one or more network traffic flows 120.

In response to determining that the communication channel 182 is no longer congested, or that the amount of congestion (e.g., a saturation level, etc.) has been reduced, the congestion management module 304 may forward, replay, or otherwise transmit the stored packets corresponding to the one or more new network traffic flows 140 over the communication channel 182 to the upstream network device 114. It should be appreciated that in embodiments wherein the congestion management module 304 stores network packets corresponding to new network traffic flows 140 during instances of congestion, network packets corresponding to one or more existing network traffic flows 130 (e.g., previously established traffic flows) may continue to be forwarded or otherwise transmitted over the communication channel 182 to the upstream network device 114. In that way, the existing network traffic flows 130 may be maintained and new network traffic flows may be temporarily stored so as not to aggravate congestion levels on the communion channel 182.

As discussed, the congestion management module 304 may enable a network storage mode during periods in which the communication channel 182 is determined to be congested. When enabled, the congestion management module 304 is configured to store network packets (e.g., the network traffic data 210) corresponding to one or more new network traffic flows 140 in local storage (e.g., the data storage 208) of the network device 112. For example, in response to determining that the communication channel 182 is congested and that the network storage mode has been enabled, the congestion management module 304 may store a network packet associated with a new network traffic flow 140 in the data storage 208 of the network device 112. As discussed above, the network packet associated with the new network traffic flow 140 may be received from the source computing device 102 and be destined for the destination computing device 104 (or vice versa). It should be appreciated that the congestion management module 304 may also be configured to store any number of network packets corresponding to the new network traffic flow 140, in some embodiments. For example, the congestion management module 304 may be configured to store all or a portion of network packets corresponding to the new network traffic flow 140 during periods of congestion. It should also be appreciated that although the congestion management module 304 stores one or more network packets corresponding to the new network traffic flow 140 in the data storage 208 in the illustrative embodiment, the congestion management module 304 may also store network packets corresponding to more than one new network traffic flow 140 (e.g., two or more new network traffic flows 140) in other embodiments.

During periods in which the network storage mode is enabled, the congestion management module 304 may also be configured to generate and transmit acknowledgement packets and/or keep-alive packets to one or more network devices 110 and/or computing devices further upstream or downstream from the network device 112 to preserve the one or more network traffic flows 120. For example, because the source computing device 102 expects to receive an acknowledgment from the destination computing device 104 for each network packet transmitted, the congestion management module 304 may be configured to generate and transmit an acknowledgement packet to the source computing device 102 for each network packet stored for the new network traffic flow 140. In doing so, the congestion management module 304 may spoof or otherwise impersonate the destination computing device 104 such that the source computing device 102 believes that the acknowledgement packets are originating from the destination computing device 104 rather than the congestion management module 304 (e.g., the network device 112). It should be appreciated that the congestion management module 304 may spoof the source Internet Protocol (IP) address of the acknowledgment packets to facilitate impersonating the destination computing device 104. Since the source computing device 102 receives the expected acknowledgments, the source computing device 102 may maintain the network connection (e.g., the new network traffic flow 140) established between the source computing device 102 and the destination computing device 104 and/or continue to send network packets upstream to the network device 112 for subsequent transmission to the upstream network device 114 and/or directly to the destination computing device 104.

In some embodiments, the congestion management module 304 of the network device 112 may also be configured to generate and transmit acknowledgement packets to one or more other network devices 110 and/or computing devices while the network storage mode is enabled. For example, for each network packet of the new network traffic flow 140 stored in the data storage 208, the congestion management module 304 may generate and transmit a corresponding acknowledgement packet to the upstream network device 114 and/or directly to the destination computing device 104. In some embodiments, one or more of the acknowledgement packets generated by the congestion management module 304 may be embodied as a keep-alive packet without a payload, but having an enabled acknowledgement flag (e.g., a packet with the acknowledgement flag turned on or otherwise set). Additionally, in some embodiments, the size of the acknowledgment packet (e.g., the keep-alive packet) generated by the congestion management module 304 may not exceed 60 bytes in size. It should be appreciated, however, that the size and/or contents of the acknowledgement packet may vary in other embodiments. In such embodiments, the keep-alive packet generated by the congestion management module 304 is configured to preserve the new network traffic flow 140. In some embodiments, the congestion management module 304 may spoof or otherwise impersonate the source computing device 102 such that the destination computing device 104 believes that the keep-alive packets are originating from the source computing device 102 rather than the congestion management module 304 (e.g., the network device 112). To do so, the congestion management module 304 may spoof the source Internet Protocol (IP) address of the acknowledgment packets to facilitate impersonating the source computing device 102. Additionally, it should be appreciated that although the congestion management module 304 of the network device 112 generates and transmits one or more acknowledgement packets (e.g., keep-alive packets) to the upstream network device 114 and/or the destination computing device 104 in order to preserve the new network traffic flow 140 in the illustrative embodiment, the congestion management module 304 may also generate and transmit one or more acknowledgement packets (e.g., keep-alive packets) to other network devices 110 and/or computing devices further upstream and/or downstream from the network device 112 in order to preserve one or more other network traffic flows over different communication channels in other embodiments.

The congestion management module 304 of the network device 112 may be also configured to determine whether the communication channel 182 is no longer congested (e.g., no longer at capacity and/or saturated with existing network traffic). To do so, the congestion management module 304 may be configured to again analyze network packets corresponding to one or more existing network traffic flows 130 over the communication channel 182 and determine whether any such network packets includes information indicative of the communication channel 182 still being congested. As discussed above, the one or more existing network traffic flows 130 may be embodied as or otherwise correspond to one or more transmission control protocol connections over the communication channel 182. As such, to determine whether the congestion of communication channel has been cleared or otherwise reduced, the congestion management module 304 may again analyze the header information of the corresponding network packets and determine whether any such header information includes a congestion widow size and/or an explicit congestion notification indicative of the communication channel 182 still being congested. The congestion management module 304 may also monitor the number and/or frequency of network packets being lost across the communication channel 182. The congestion management module 304 may thereafter determine that the number and/or frequency of network packets being retransmitted over the communication channel 182, or the number and/or frequency of duplicate acknowledgments being received over the communication channel 182, still exceeds the reference amount or frequency. In such embodiments, the congestion management module 304 may determine that the communication channel 182 is still congested. In some embodiments, congestion management module 304 may instead determine that the number and/or frequency of network packets being retransmitted over the communication channel 182, or the number and/or frequency of duplicate acknowledgments being received over the communication channel 182, no longer exceeds the reference amount or frequency. In such embodiments, the congestion management module 304 may determine that the communication channel 182 is no longer congested. It should be appreciated that the congestion management module 304 may determine that the communication channel 182 is no longer congested sometime after the source computing device 102 has finished transmitting network packets to the network device 112.

In embodiments wherein the congestion management module 304 determines that that communication channel 182 is no longer congested, the congestion management module 304 may be configured to retrieve the network packets corresponding to the new network traffic flow 140 stored in the data storage 208 of the network device 112 and forward or otherwise transmit those packets to the upstream network device 114, which may in turn forward the packets to the destination computing device 104 or one or more other network devices 110. For example, in some embodiments, the congestion management module 304 is configured to replay or retransmit the stored packets to the upstream network device 114 and/or the destination computing device 104 after determining that the communication channel 182 is no longer congested. In such embodiments, the congestion management module 304 may spoof or otherwise impersonate the source computing device 102 such that the upstream network device 114 and/or the destination computing device 104 believes the replayed network packets are originating from the source computing device 102 rather than the network device 112. For example, in some embodiments, the congestion management module 304 may spoof the source IP address of the replayed network packets. It should be appreciated that upon receipt of the replayed and/or retransmitted network packets, the destination computing device 104 may generate and transmit corresponding acknowledgment packets. In embodiments wherein the congestion management module 304 spoofs the source IP address of the replayed network packets, the congestion management module 304 may receive or otherwise intercept the acknowledgement packets sent by the destination computing device 104. In doing so, the congestion management module 304 may prevent the source computing device 102 from receiving duplicate acknowledgements for each of the stored network packets (e.g., receiving an acknowledgment from the network device 112 when a network packet is initially stored and receiving another acknowledgment when the stored network packet is finally received by the destination computing device 104).

As discussed, in some embodiments, the network traffic data 210 stored in the data storage 208 of the network device 112 may also include information regarding one or more of the network traffic flows 120. For example, in some embodiments, the network traffic data 210 may include information corresponding to the status (e.g., active, amount of time inactive, etc.) of one or more of the network traffic flows 120. Such information may be stored in one or more tables, files, and/or in any other format suitable for storing traffic flow information. In some embodiments, the congestion management module 304 may be configured to determine whether an incoming acknowledgement packet from the destination computing device 104 corresponds to one or more of the replayed network packets. To do so, the congestion management module 304 may track or otherwise store transmission information (e.g., sequence numbers, unique identifiers, etc.) regarding each of the stored network packets that have been replayed (e.g., retransmitted) to the upstream network device 114 and/or directly to the destination computing device 104. Subsequently, in response to receiving an acknowledgment packet from the destination computing device 104, the congestion management module 304 may determine whether the received acknowledgment packet corresponds to one of the replayed network packets based at least in part on, or otherwise as a function of, the stored transmission information. In some embodiments, in response to determining that the received acknowledgment corresponds to one of the replayed network packets, the congestion management module 304 may be configured to discard or drop the acknowledgment packet to prevent it from being received by the source computing device 102.

The congestion management module 304 may also be configured to disable the network storage mode for network packets subsequently received for the new network traffic flow 140. For example, in some embodiments, the congestion management module 304 may disable the network storage mode in response to determining that the communication channel 182 is no longer congested. Additionally, in some embodiments, the congestion management module 304 may throttle or otherwise manage the rate in which the network packets are retrieved from the data storage 208 and released (e.g., transmitted, forwarded, replayed, etc.) to the upstream network device 114 and/or directly to the destination computing device 104. In doing so, the congestion management module 304 may reduce the likelihood of the stored network packets causing a new congestion and/or aggravating an existing congestion of the communication channel 182 when released.

As discussed, the congestion management module 304 may store network packets corresponding to more than one new network traffic flow 140 in the data storage 208 of the network device 112. For example, in some embodiments, the congestion management module 304 may store one or more network packets corresponding to the new network traffic flow 140 and one or more network packets corresponding to another new network traffic flow in the data storage 208. In such embodiments, the congestion management module 304 may retrieve and subsequently transmit the network packets corresponding to the new network traffic flow 140 and the other new network traffic flow to the upstream network device 114 based at least in part on, or otherwise as a function of, the order in which the network packets were stored in the data storage 208.

In embodiments wherein the congestion management module 304 instead determines that that communication channel 182 is still congested (e.g., still saturated and or at capacity), the congestion management module 304 may be configured to wait a reference amount of time before determining again whether the communication channel 182 is still congested. That is, the congestion management module 304 may be configured to re-determine whether the communication channel 182 is still congested in response to a reference time period lapsing.

Additionally or alternatively, in some embodiments, the congestion management module 304 may also be configured to determine whether the network device 112 has the capacity and/or availability to store network packets corresponding to one or more new network traffic flows 140 during periods that the communication channel 182 is determined to be congested. In such embodiments, the congestion management module 304 may determine that the network device 112 does not have the capacity and/or availability to store newly received network packets corresponding to one or more of the new network traffic flows 140 based one or more reference capacity and/or availability thresholds. For example, in some embodiments, the congestion management module 304 may monitor the amount of storage capacity remaining and/or used in the data storage 208 and, based at least in part on the amount of storage capacity remaining and/or used in the data storage 208 one of exceeding or falling below one or more of the reference capacity or availability thresholds, the congestion management module 304 may determine that the network device 112 does not have the capacity and/or availability to store newly received network packets corresponding to new network traffic flows. Additionally, or alternatively, in some embodiments, the congestion management module 304 may monitor performance metrics corresponding to the network device 112 (e.g., network interface controller availability, processor utilization, etc.) and, as a function of the monitored performance metrics one of exceeding or falling below one or more of the reference capacity or availability thresholds, the congestion management module 304 may determine that the network device 112 does not have the capacity and/or availability to store newly received network packets corresponding to new network traffic flows. In such embodiments, the newly received network packets corresponding the new network traffic flows may be forwarded to the upstream network device 114 and/or the destination computing device 104 unimpeded (e.g., processed normally).

In some embodiments, the congestion management module 304 may also be configured to determine whether to store received network packets corresponding to a new network traffic flow 140 during periods of congestion based at least in part on, or otherwise as a function of, the type of the new traffic flow 140. For example, in some embodiments the congestion management module 304 may determine that received network packets corresponding to a new network traffic flow 140 should not be stored in response to determining that the new network traffic flow 140 corresponds to a real-time traffic flow (e.g., voice communications, video communications, streaming data, etc.). In such embodiments, the newly received network packets corresponding the new network traffic flows 140 may be forwarded to the upstream network device 114 unimpeded (e.g., processed normally).

Figure 4:
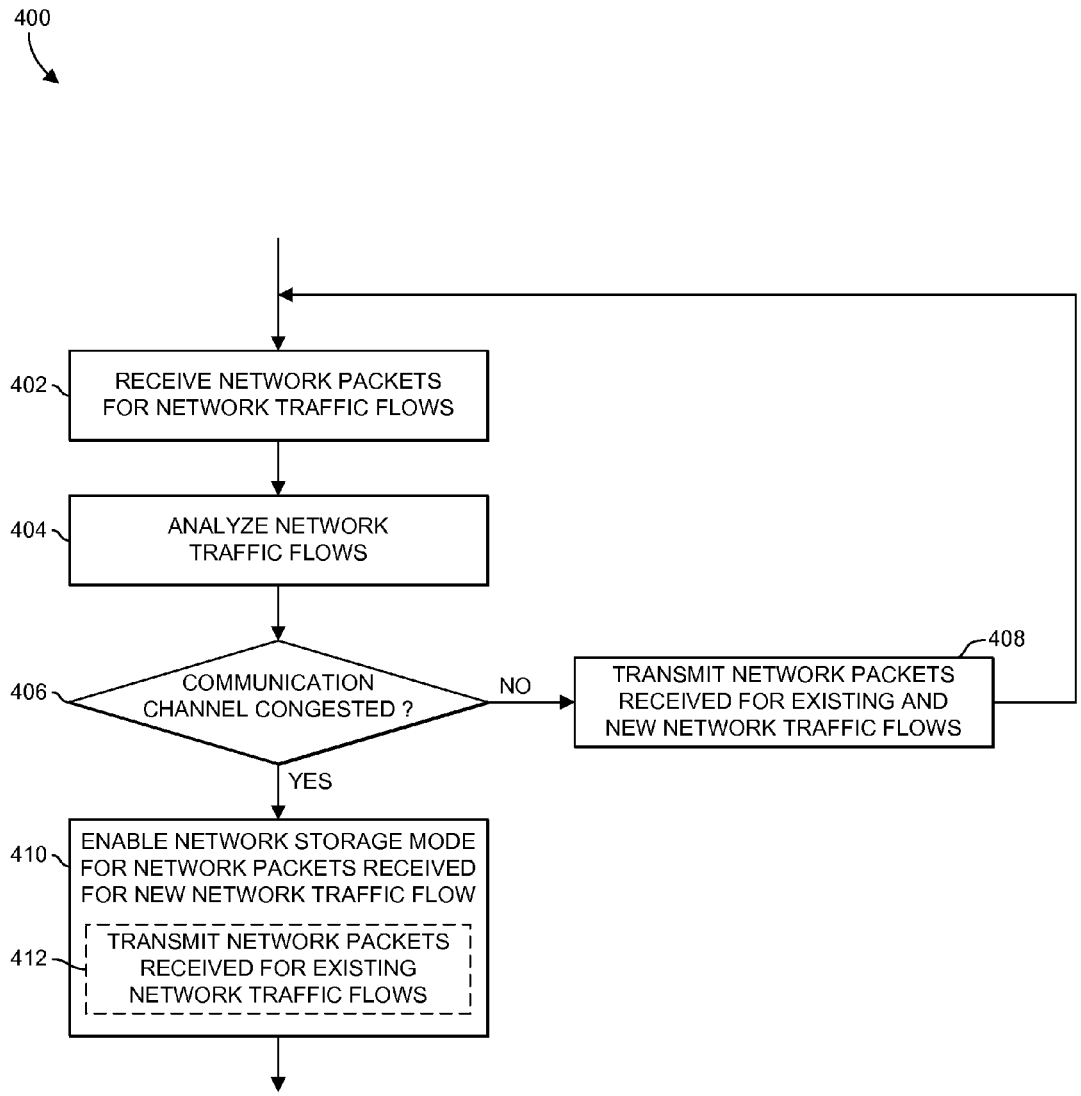
FIG. 4 is a simplified block diagram of at least one embodiment of a method for managing congestion of a network communication channel that may be executed by the network(s) device of FIGS. 1-3.

Referring now to FIG. 4, in use, the network device 112 of the system 100 may execute a method for managing congestion of a communication channel 182 established with another network device 110 (e.g., the upstream network device 114). The method 400 begins with block 402 in which the network device 112 receives network packets corresponding to one or more network traffic flows 120 established between the source computing device 102 and the destination computing device 102 over the communication channel 182. The one or more network traffic flows 120 may correspond to one or more existing network traffic flows 130, or they may correspond to one or more new network traffic flows 140. As discussed, the network device 112 may receive network packets from the source computing device 102 that are to be forwarded over the communication channel 182 to the upstream network device 114 for further processing. For example, in some embodiments, the network device 112 may receive one or more network packets from the source computing device 102 that are to be forwarded to the upstream network device 114, which may subsequently forward those packets to the destination computing device 104. The network device 112 may also receive network packets from the upstream network device 114 that are to be forwarded to the source computing device 102.

At block 404, the network device 112 analyzes the network packets corresponding to the one or more network traffic flows 120. To do so, the network device 112 may monitor the packet headers of network packets received from the upstream network device 114 over the communication channel 182. As discussed above, the network device 112 may also monitor transmission and/or utilization metrics corresponding to the communication channel 182 and/or the network traffic flows 120.

At block 406, the network device 112 determines whether the communication channel 182 is congested. In some embodiments, the network device 112 determines that the communication channel 182 is congested based at least in part on, or otherwise as a function of, analyzing the one or more network traffic flows 120. For example, in some embodiments, the network device 112 determines that the communication channel 182 is congested in response to determining that one or more network packets associated with one or more of the existing network traffic flows 130 includes a congestion widow size and/or an explicit congestion notification indicative of the communication channel 182 being congested. If, at block 406, it is determined that the communication channel 182 is not congested, the method 400 advances to block 408. If, however, it is instead determined at block 406 that the communication channel 182 is congested, the method 400 advances to block 410.

At block 408, the network device 112 transmits, to the upstream network device 114, received network packets corresponding to the existing network traffic flows 130 as well as network packets corresponding to the new network traffic flows 140. The method 400 then returns back to block 402 in which the network device 112 continues receiving network packets over the communication channel 182 that correspond to the one or more network traffic flows 120 established between the source computing device 102 and the destination computing device 104.

At block 410, the network device 112 enables, in some embodiments, a network storage mode for newly received packets corresponding to one or more new network traffic flows over the communication channel 182 established between the network device 112 and the upstream network device 114. In such embodiments, the network device 112 temporarily stores network packets corresponding to the one or more new network traffic flows 140 during periods of time in which the communication channel 182 is congested. At block 412, in some embodiments, the network device 112 may continue to forward network packets corresponding to the one or more existing network traffic flows 130 to the upstream network device 114 as discussed above.

Figure 5:
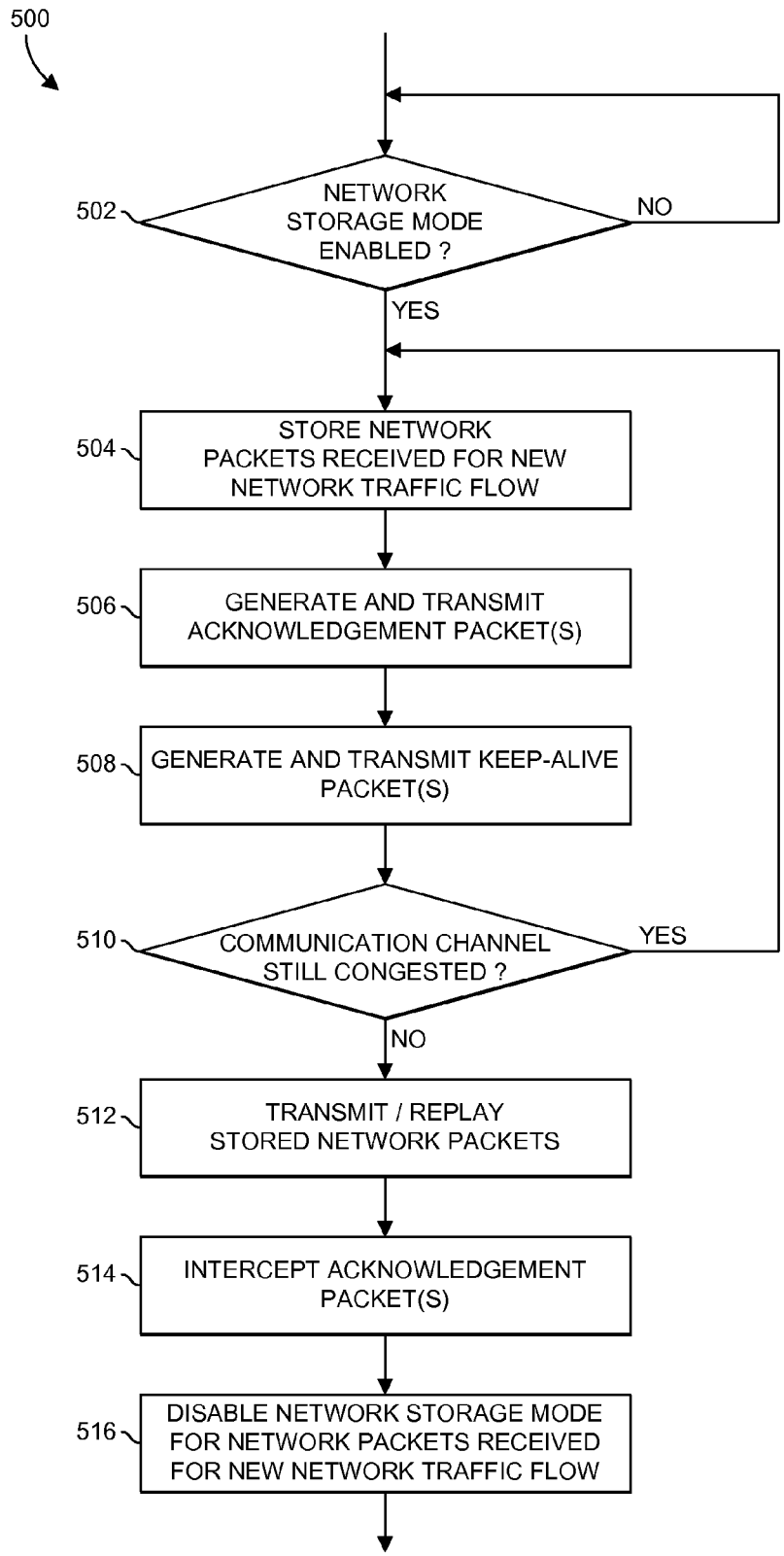
FIG. 5 is a simplified block diagram of at least one embodiment of a method for storing network packets of new network traffic flows to manage congestion of a network communication channel that may be executed by the network device(s) of FIGS. 1-3.

Referring now to FIG. 5, in use, the network device 112 of the system 100 may execute a method 500 for storing network packets of a new network traffic flow 140 to manage the congestion of the communication channel 182 established with another network device 110 (e.g., the upstream network device 114). The method 500 begins with block 502 in which the network device 112 determines whether the network storage mode has been enabled. As discussed above, the network device 112 may enable the network storage mode in response to determining that the communication channel 182 is congested. If, at block 502, it is determined that the network storage mode has not been enabled, the method 500 returns to block 502. If, however, it is determined instead that the network storage mode has been enabled, the method 500 advances to block 504.

At block 504, the network device 112 stores received network packets corresponding to one or more new network traffic flows 140. As discussed, in some embodiments, the network packets corresponding to the one or more new network traffic flows 140 are stored as network traffic data 210 in the data storage 208 of the network device 112. After storing the network packets corresponding to the one or more new network traffic flows 140 in the data storage 208 of the network device 112, the method 500 advances to block 506.

At block 506, the network device 112 generates and transmits an acknowledgement packet to the source computing device 102 for each network packet stored in the data storage 208. In some embodiments, the network device 112 spoofs a source IP address of the acknowledgement packets such that the source computing device 102 believes that the acknowledgement packets are originating from the destination computing device 104 rather than the network device 112. In such embodiments, the acknowledgment packets are configured to facilitate preserving or otherwise maintaining the one or more new network traffic flows 140 established between the source computing device 102 and the destination computing device 104. After generating and transmitting the acknowledgement packet(s) to the source computing device 102, the method 500 advances to block 508.

At block 508, the network device 112 generates and transmits an acknowledgement packet to the upstream network device 114 and/or the destination computing device 104 for each network packet stored in the data storage 208. In some embodiments, the acknowledgement packet generated by the network device 112 is embodied as a keep-alive packet without a payload, but having an acknowledgement flag enabled. In such embodiments, the keep-alive packet is configured to preserve or otherwise maintain the one or more new network traffic flows 140 established between the source computing device 102 and the destination computing device 104. Additionally or alternatively, the network device 112 spoofs a source IP address of the keep-alive packets such that the destination computing device 104 believes that the keep-alive packets are originating from the source computing device 102 rather than the network device 112. After generating and transmitting the keep-alive packet(s) to the upstream network device 114 and/or the destination computing device 104, the method 500 advances to block 510.

At block 510, the network device 112 determines whether the communication channel 182 is still congested. As discussed above, the network device 112 determines whether the communication channel 182 is still congested based at least in part on, or otherwise as a function of, analyzing the one or more network traffic flows 120. For example, in some embodiments, the network device 112 determines that the communication channel 182 is congested in response to determining that one or more network packets associated with the one or more existing network traffic flows 130 includes a congestion widow size and/or an explicit congestion notification indicative of the communication channel 182 still being congested. If, at block 510, it is determined that the communication channel 182 is still congested, the method 500 returns to block 504, in which the network device 112 continues to store network packets corresponding to the one or more new network traffic flows 140. If, however, it is instead determined at block 510 that the communication channel 182 is no longer congested, the method 500 advances to block 512.

At block 512, the network device 112 transmits the stored network packets to the upstream network device 114. For example, in some embodiments, the network device 112 may be configured to retrieve the network packets corresponding to the one or more new network traffic flows 140 stored in the data storage 208 of the network device 112 and forward or replay those packets to the upstream network device 114, which may in turn forward the packets to a computing device (e.g., the destination computing device 104) or one or more other network devices 110. After transmitting the network packets stored in the data storage 208 of the network device 112, the method 500 advances to block 514.

At block 514, the network device 112 intercepts acknowledgement packets from the destination computing device 104 for each of the replayed network packets. In some embodiments, the network device 112 determines whether a received acknowledgment packet corresponds to one or more network packets replayed to the upstream network device 114 and/or directly to the destination computing device 104. To do so, the network device 112 compares information corresponding to the acknowledgment packets received from the destination computing device 104 against stored transmission information corresponding to the replayed network packets. In some embodiments, the network device 112 drops or otherwise discards one or more acknowledgments received from the destination computing device 104 based at least in part on, or otherwise as a function of, determining that one or more of the acknowledgement packets correspond to one of the replayed network packets. In that way, the network device 112 prevents the source computing device 102 from receiving duplicate acknowledgements for each of the stored network packets. After intercepting the acknowledgment packets from the destination computing device 104, the method 500 advances to block 516 in which the network device 112 disables the network storage mode for subsequently received network packets corresponding to the one or more new network traffic flows 140.

EXAMPLES

Illustrative examples of the technologies disclosed herein are provided below. An embodiment of the technologies may include any one or more, and any combination of, the examples described below.

Example 1 includes a network device to manage congestion of a communication channel, the network device includes a communication module to receive a network packet from a computing device destined for another computing device, wherein the received network packet corresponds to a new network traffic flow of a plurality of network traffic flows over a communication channel established between the network device and an upstream network device; and a congestion management module to (i) analyze the plurality of network traffic flows over the communication channel established between the network device and the upstream network device, (ii) determine whether the communication channel is congested as a function of the plurality of network traffic flows, (iii) store the received network packet in a local storage in response to a determination that the communication channel is congested, and (iv) transmit an acknowledgment packet to the computing device in response to the storage of the received network packet in the local storage.

Example 2 includes the subject matter of Example 1, and wherein the congestion management module further to (i) determine whether the communication channel is no longer congested, and (ii) transmit the stored network packet to the upstream network device in response to a determination that the communication channel is no longer congested.

Example 3 includes the subject matter of any of Examples 1 and 2, and wherein the communication module further to receive another network packet, wherein the another network packet corresponds to an existing network traffic flow of the plurality of network traffic flows over the communication channel; and wherein the congestion management module further to transmit the another network packet to the upstream network device without storage of the another network packet in the local storage.

Example 4 includes the subject matter of any of Examples 1-3, and wherein to determine whether the communication channel is no longer congested includes to determine whether the communication channel is no longer congested in response to a lapse of a reference time period.

Example 5 includes the subject matter of any of Examples 1-4, and wherein the plurality of traffic flows includes a plurality of transmission control protocol connections over the communication channel.

Example 6 includes the subject matter of any of Examples 1-5, and wherein to analyze a plurality of network traffic flows over the communication channel established between the network device and the upstream network device includes to analyze at least one of (i) congestion window sizes or (ii) explicit congestion notifications that correspond to the plurality of transmission control protocol connections over the communication channel; wherein to determine whether the communication channel is congested as a function of the plurality of network traffic flows includes to determine whether the communication channel is congested as a function of at least one of the congestion window sizes or explicit congestion notifications that correspond to the plurality of transmission control protocol connections over the communication channel; and wherein to determine whether the communication channel is no longer congested includes to determine whether the communication channel is no longer congested as a function of at least one of the congestion window sizes or explicit congestion notifications that correspond to the plurality of transmission control protocol connections over the communication channel.

Example 7 includes the subject matter of any of Examples 1-6, and wherein to determine whether the communication channel is congested as a function of the plurality of network traffic flows includes to determine whether the communication channel is congested as a function of at least one of (i) a quantity of network packets retransmitted over the communication channel or (ii) a frequency of network packet retransmissions over the communication channel.

Example 8 includes the subject matter of any of Examples 1-7, and wherein to determine whether the communication channel is congested as a function of the plurality of network traffic flows includes to determine whether the communication channel is congested as a function of at least one of (i) a quantity of duplicate acknowledgement packets received over the communication channel or (ii) a frequency of receiving duplicate network packets over the communication channel.

Example 9 includes the subject matter of any of Examples 1-8, and wherein the communication module further to receive another network packet from the computing device destined for the another computing device, wherein the another network packet corresponds to another new network traffic flow of the plurality of network traffic flows over the communication channel; and wherein the congestion management module further to (i) store the received another network packet in the local storage in response to a determination that the communication channel is congested, (ii) transmit another acknowledgment packet to the upstream network device in response to the storage of the received another network packet in the local storage, and (iii) transmit the stored another network packet upstream to the computing device in response to a determination that the communication channel is no longer congested.

Example 10 includes the subject matter of any of Examples 1-9, and wherein to transmit the stored network packet and the stored another network packet to the upstream network device in response to a determination that the communication channel is no longer congested includes to transmit the stored network packet and the stored another network packet to the upstream network device as a function of an order in which the network packet and the another network packet are stored in the local storage.

Example 11 includes the subject matter of any of Examples 1-10, and wherein to transmit an acknowledgment packet to the computing device includes to transmit a first acknowledgment packet to the computing device; and wherein the congestion management module further to transmit a second acknowledgment packet to the upstream network device in response to the storage of the received network packet in the local storage.

Example 12 includes the subject matter of any of Examples 1-11, and wherein the second acknowledgement packet is a keep-alive packet including an enabled acknowledgement flag.

Example 13 includes the subject matter of any of Examples 1-12, and wherein the congestion management module further to receive a third acknowledgment packet from the another computing device in response to transmitting the stored network packet to the upstream network device.

Example 14 includes the subject matter of any of Examples 1-13, and wherein to receive a third acknowledgment packet from the another computing device includes to (i) intercept the third acknowledgment packet from the another computing device and (ii) prevent the computing device from receiving the third acknowledgment packet.

Example 15 includes the subject matter of any of Examples 1-14, and wherein to prevent the computing device from receiving the third acknowledgment packet includes to drop the third acknowledgment packet upon receipt from the another computing device.

Example 16 includes the subject matter of any of Examples 1-15, and wherein the congestion management module further to (i) spoof a source internet protocol address of the first acknowledgment packet transmitted to the computing device, (ii) spoof the source internet protocol address of the second acknowledgment packet transmitted to the upstream network device, and (iii) spoof the source internet protocol address of the stored network packet transmitted to the upstream network device.

Example 17 includes the subject matter of any of Examples 1-16, and wherein the local storage includes a solid-state storage device.

Example 18 includes a method for managing congestion of a communication channel, the method includes receiving, on a network device, a network packet from a computing device destined for another computing device, wherein the received network packet corresponds to a new network traffic flow of a plurality of network traffic flows over a communication channel established between the network device and an upstream network device; analyzing, on the network device, the plurality of network traffic flows over the communication channel established between the network device and the upstream network device; determining, on the network device, whether the communication channel is congested as a function of the plurality of network traffic flows; storing, on the network device, the received network packet in a local storage in response to determining that the communication channel is congested; and transmitting, on the network device, an acknowledgment packet to the computing device in response to storing the received network packet in the local storage.

Example 19 includes the subject matter of Example 18, and further includes determining, on the network device, whether the communication channel is no longer congested; and transmitting, on the network device, the stored network packet to the upstream network device in response to determining that the communication channel is no longer congested.

Example 20 includes the subject matter of any of Examples 18 and 19, and further includes receiving, on the network device, another network packet, wherein the another network packet corresponds to an existing network traffic flow of the plurality of network traffic flows over the communication channel; and transmitting, on the network device, the another network packet to the upstream network device without storing the another network packet in the local storage.

Example 21 includes the subject matter of any of Examples 18-20, and wherein determining whether the communication channel is no longer congested includes determining whether the communication channel is no longer congested in response to a lapse of a reference time period.

Example 22 includes the subject matter of any of Examples 18-21, and wherein the plurality of traffic flows includes a plurality of transmission control protocol connections over the communication channel.

Example 23 includes the subject matter of any of Examples 18-22, and wherein analyzing a plurality of network traffic flows over a communication channel established between the network device and an upstream network device includes analyzing at least one of (i) congestion window sizes or (ii) explicit congestion notifications corresponding to the plurality of transmission control protocol connections over the communication channel; wherein determining whether the communication channel is congested as a function of the network traffic flows includes determining whether the communication channel is congested as a function of at least one of the congestion window sizes or explicit congestion notifications corresponding to the plurality of transmission control protocol connections over the communication channel; and wherein determining whether the communication channel is no longer congested includes determining whether the communication channel is no longer congested as a function of at least one of the congestion window sizes or explicit congestion notifications corresponding to the plurality of transmission control protocol connections over the communication channel.

Example 24 includes the subject matter of any of Examples 18-23, and wherein determining whether the communication channel is congested as a function of the plurality of network traffic flows includes determining whether the communication channel is congested as a function of at least one of (i) a quantity of network packets retransmitted over the communication channel or (ii) a frequency of network packet retransmissions over the communication channel.

Example 25 includes the subject matter of any of Examples 18-24, and wherein determining whether the communication channel is congested as a function of the plurality of network traffic flows includes determining whether the communication channel is congested as a function of at least one of (i) a quantity of duplicate acknowledgement packets received over the communication channel or (ii) a frequency of receiving duplicate network packets over the communication channel.

Example 26 includes the subject matter of any of Examples 18-25, and further includes receiving, on the network device, another network packet from the computing device destined for the another computing device, wherein the another network packet corresponds to another new network traffic flow of the plurality of network traffic flows over the communication channel; storing, on the network device, the received another network packet in the local storage in response to determining that the communication channel is congested; transmitting, on the network device, another acknowledgment packet to the upstream network device in response to storing the received another network packet in the local storage; and transmitting, on the network device, the stored another network packet to the computing device in response to determining that the communication channel is no longer congested.

Example 27 includes the subject matter of any of Examples 18-26, and wherein transmitting the stored network packet and the stored another network packet to the upstream network device in response to determining that the communication channel is no longer congested includes transmitting the stored network packet and the stored another network packet to the upstream network device as a function of an order in which the network packet and the another network packet are stored in the local storage.

Example 28 includes the subject matter of any of Examples 18-27, and wherein transmitting an acknowledgment packet to the computing device includes transmitting a first acknowledgment packet to the computing device; and wherein the method further includes transmitting, on the network device, a second acknowledgment packet to the upstream network device in response to storing the received network packet in the local storage.

Example 29 includes the subject matter of any of Examples 18-28, and wherein the second acknowledgement packet is a keep-alive packet including an enabled acknowledgement flag.

Example 30 includes the subject matter of any of Examples 18-29, and further includes receiving, on the network device, a third acknowledgment packet from the another computing device in response to transmitting the stored network packet to the upstream network device.

Example 31 includes the subject matter of any of Examples 18-30, and wherein receiving a third acknowledgment packet from the another computing device includes (i) intercepting the third acknowledgment packet from the another computing device and (ii) preventing the computing device from receiving the third acknowledgment packet.

Example 32 includes the subject matter of any of Examples 18-31, and wherein preventing the computing device from receiving the third acknowledgment packet includes dropping the third acknowledgment packet upon receipt from the another computing device.

Example 33 includes the subject matter of any of Examples 18-32, and further includes spoofing, on the network device, a source internet protocol address of the first acknowledgment packet transmitted to the computing device; spoofing, on the network device, the source internet protocol address of the second acknowledgment packet transmitted to the upstream network device; and spoofing, on the network device, the source internet protocol address of the stored network packet transmitted to the upstream network device.

Example 34 includes the subject matter of any of Examples 18-33, and further includes generating, on the network device, the acknowledgment packet transmitted to the upstream network device.

Example 35 includes a network device to manage congestion of a communication channel, the network device includes a processor; and a memory having stored therein a plurality of instructions that when executed by the processor cause the network device to perform the method of any of Examples 18-34.

Example 36 includes one or more machine readable media including a plurality of instructions stored thereon that in response to being executed result in a network device performing the method of any of Examples 18-34.

Example 37 includes a network device to manage congestion of a communication channel, the network device includes means for receiving a network packet from a computing device destined for another computing device, wherein the received network packet corresponds to a new network traffic flow of a plurality of network traffic flows over a communication channel established between the network device and an upstream network device; means for analyzing the plurality of network traffic flows over the communication channel established between the network device and the upstream network device; means for determining whether the communication channel is congested as a function of the plurality of network traffic flows; means for storing the received network packet in a local storage in response to determining that the communication channel is congested; and means for transmitting an acknowledgment packet to the computing device in response to storing the received network packet in the local storage.

Example 38 includes the subject matter of Example 37, and further includes means for determining whether the communication channel is no longer congested; and means for transmitting the stored network packet to the upstream network device in response to determining that the communication channel is no longer congested.

Example 39 includes the subject matter of any of Examples 37 and 38, and further includes means for receiving another network packet, wherein the another network packet corresponds to an existing network traffic flow of the plurality of network traffic flows over the communication channel; and means for transmitting the another network packet to the upstream network device without storing the another network packet in the local storage.

Example 40 includes the subject matter of any of Examples 37-39, and wherein the means for determining whether the communication channel is no longer congested includes means for determining whether the communication channel is no longer congested in response to a lapse of a reference time period.

Example 41 includes the subject matter of any of Examples 37-40, and wherein the plurality of traffic flows includes a plurality of transmission control protocol connections over the communication channel.

Example 42 includes the subject matter of any of Examples 37-41, and wherein the means for analyzing a plurality of network traffic flows over a communication channel established between the network device and an upstream network device includes means for analyzing at least one of (i) congestion window sizes or (ii) explicit congestion notifications corresponding to the plurality of transmission control protocol connections over the communication channel; wherein the means for determining whether the communication channel is congested as a function of the network traffic flows includes means for determining whether the communication channel is congested as a function of at least one of the congestion window sizes or explicit congestion notifications corresponding to the plurality of transmission control protocol connections over the communication channel; and wherein the means for determining whether the communication channel is no longer congested includes means for determining whether the communication channel is no longer congested as a function of at least one of the congestion window sizes or explicit congestion notifications corresponding to the plurality of transmission control protocol connections over the communication channel.

Example 43 includes the subject matter of any of Examples 37-42, and wherein the means for determining whether the communication channel is congested as a function of the plurality of network traffic flows includes means for determining whether the communication channel is congested as a function of at least one of (i) a quantity of network packets retransmitted over the communication channel or (ii) a frequency of network packet retransmissions over the communication channel.

Example 44 includes the subject matter of any of Examples 37-43, and wherein the means for determining whether the communication channel is congested as a function of the plurality of network traffic flows includes means for determining whether the communication channel is congested as a function of at least one of (i) a quantity of duplicate acknowledgement packets received over the communication channel or (ii) a frequency of receiving duplicate network packets over the communication channel.

Example 45 includes the subject matter of any of Examples 37-44, and further includes means for receiving another network packet from the computing device destined for the another computing device, wherein the another network packet corresponds to another new network traffic flow of the plurality of network traffic flows over the communication channel; means for storing the received another network packet in the local storage in response to determining that the communication channel is congested; means for transmitting another acknowledgment packet to the upstream network device in response to storing the received another network packet in the local storage; and means for transmitting the stored another network packet to the computing device in response to determining that the communication channel is no longer congested.

Example 46 includes the subject matter of any of Examples 37-45, and wherein the means for transmitting the stored network packet and the stored another network packet to the upstream network device in response to determining that the communication channel is no longer congested includes means for transmitting the stored network packet and the stored another network packet to the upstream network device as a function of an order in which the network packet and the another network packet are stored in the local storage.

Example 47 includes the subject matter of any of Examples 37-46, and wherein the means for transmitting an acknowledgment packet to the computing device includes means for transmitting a first acknowledgment packet to the computing device; and wherein the network device further includes means for transmitting a second acknowledgment packet to the upstream network device in response to storing the received network packet in the local storage.

Example 48 includes the subject matter of any of Examples 37-47, and wherein the second acknowledgement packet is a keep-alive packet including an enabled acknowledgement flag.

Example 49 includes the subject matter of any of Examples 37-48, and further includes means for receiving a third acknowledgment packet from the another computing device in response to transmitting the stored network packet to the upstream network device.

Example 50 includes the subject matter of any of Examples 37-49, and wherein the means for receiving a third acknowledgment packet from the another computing device includes means for (i) intercepting the third acknowledgment packet from the another computing device and (ii) preventing the computing device from receiving the third acknowledgment packet.

Example 51 includes the subject matter of any of Examples 37-50, and wherein the means for preventing the computing device from receiving the third acknowledgment packet includes means for dropping the third acknowledgment packet upon receipt from the another computing device.

Example 52 includes the subject matter of any of Examples 37-51, and further includes means for spoofing a source internet protocol address of the first acknowledgment packet transmitted to the computing device; means for spoofing the source internet protocol address of the second acknowledgment packet transmitted to the upstream network device; and means for spoofing the source internet protocol address of the stored network packet transmitted to the upstream network device.

Example 53 includes the subject matter of any of Examples 37-52, and further includes means for generating the acknowledgment packet transmitted to the upstream network device.

The invention claimed is:

1. A network device to manage congestion of a communication channel, the network device comprising:
 a communication module to receive a network packet from a computing device destined for another computing device, wherein the received network packet corresponds to a new network traffic flow of a plurality of network traffic flows over a communication channel established between the network device and an upstream network device; and
 a congestion management module to (i) analyze the plurality of network traffic flows over the communication channel established between the network device and the upstream network device, (ii) determine whether the communication channel is congested as a function of the plurality of network traffic flows, (iii) store the received network packet in a local storage in response to a determination that the communication channel is congested, (iv) transmit, in response to the storage of the received network packet in the location storage, a first acknowledgment packet to the computing device and a second acknowledgement packet to the upstream network device, (v) determine whether the communication channel is no longer congested, and (vi) transmit the stored network packet to the upstream network device in response to a determination that the communication channel is no longer congested.

2. The network device of claim 1, wherein the communication module further to receive another network packet, wherein the another network packet corresponds to an existing network traffic flow of the plurality of network traffic flows over the communication channel; and
 wherein the congestion management module further to transmit the another network packet to the upstream network device without storage of the another network packet in the local storage.

3. The network device of claim 1, wherein to determine whether the communication channel is no longer congested comprises to determine whether the communication channel is no longer congested in response to a lapse of a reference time period.

4. The network device of claim 1, wherein the plurality of traffic flows comprise a plurality of transmission control protocol connections over the communication channel;
 wherein to analyze a plurality of network traffic flows over the communication channel established between the network device and the upstream network device comprises to analyze at least one of (i) congestion window sizes or (ii) explicit congestion notifications that correspond to the plurality of transmission control protocol connections over the communication channel;

wherein to determine whether the communication channel is congested as a function of the plurality of network traffic flows comprises to determine whether the communication channel is congested as a function of at least one of the congestion window sizes or explicit congestion notifications that correspond to the plurality of transmission control protocol connections over the communication channel; and wherein to determine whether the communication channel is no longer congested comprises to determine whether the communication channel is no longer congested as a function of at least one of the congestion window sizes or explicit congestion notifications that correspond to the plurality of transmission control protocol connections over the communication channel.

5. The network device of claim 1, wherein to determine whether the communication channel is congested as a function of the plurality of network traffic flows comprises to determine whether the communication channel is congested as a function of at least one of (i) a quantity of network packets retransmitted over the communication channel, (ii) a frequency of network packet retransmissions over the communication channel, (iii) a quantity of duplicate acknowledgement packets received over the communication channel, or (iv) a frequency of receiving duplicate network packets over the communication channel.

6. The network device of claim 1, wherein the communication module further to receive another network packet from the computing device destined for the another computing device, wherein the another network packet corresponds to another new network traffic flow of the plurality of network traffic flows over the communication channel; and wherein the congestion management module further to (i) store the received another network packet in the local storage in response to a determination that the communication channel is congested, (ii) transmit another acknowledgment packet to the upstream network device in response to the storage of the received another network packet in the local storage, and (iii) transmit the stored another network packet upstream to the computing device in response to a determination that the communication channel is no longer congested.

7. The network device of claim 6, wherein to transmit the stored network packet and the stored another network packet to the upstream network device in response to a determination that the communication channel is no longer congested comprises to transmit the stored network packet and the stored another network packet to the upstream network device as a function of an order in which the network packet and the another network packet are stored in the local storage.

8. The network device of claim 1, wherein the second acknowledgement packet is a keep-alive packet comprising an enabled acknowledgement flag; and wherein the congestion management module further to receive a third acknowledgment packet from the another computing device in response to transmitting the stored network packet to the upstream network device.

9. The network device of claim 8, wherein to receive a third acknowledgment packet from the another computing device comprises to (i) intercept the third acknowledgment packet from the another computing device and (ii) prevent the computing device from receiving the third acknowledgment packet.

10. The network device of claim 9, wherein to prevent the computing device from receiving the third acknowledgment packet comprises to drop the third acknowledgment packet upon receipt from the another computing device.

11. The network device of claim 1, wherein the congestion management module further to (i) spoof a source internet protocol address of the first acknowledgment packet transmitted to the computing device, (ii) spoof the source internet protocol address of the second acknowledgment packet transmitted to the upstream network device, and (iii) spoof the source internet protocol address of the stored network packet transmitted to the upstream network device.

12. The network device of claim 1, wherein the local storage comprises a solid-state storage device.

13. A method for managing congestion of a communication channel, the method comprising:

receiving, on a network device, a network packet from a computing device destined for another computing device, wherein the received network packet corresponds to a new network traffic flow of a plurality of network traffic flows over a communication channel established between the network device and an upstream network device;

analyzing, on the network device, the plurality of network traffic flows over the communication channel established between the network device and the upstream network device;

determining, on the network device, whether the communication channel is congested as a function of the plurality of network traffic flows;

storing, on the network device, the received network packet in a local storage in response to determining that the communication channel is congested;

transmitting, on the network device and in response to storing the received network packet in the local storage, a first acknowledgment packet to the computing device and a second acknowledgment packet to the upstream network device;

determining, on the network device, whether the communication channel is no longer congested; and transmitting, on the network device, the stored network packet to the upstream network device in response to determining that the communication channel is no longer congested.

14. The method of claim 13, further comprising:

receiving, on the network device, another network packet, wherein the another network packet corresponds to an existing network traffic flow of the plurality of network traffic flows over the communication channel; and transmitting, on the network device, the another network packet to the upstream network device without storing the another network packet in the local storage.

15. The method of claim 13, wherein determining whether the communication channel is no longer congested comprises determining whether the communication channel is no longer congested in response to a lapse of a reference time period.

16. The method of claim 13, wherein the plurality of traffic flows comprise a plurality of transmission control protocol connections over the communication channel;

wherein analyzing a plurality of network traffic flows over a communication channel established between the network device and an upstream network device comprises analyzing at least one of (i) congestion window sizes or (ii) explicit congestion notifications corresponding to the plurality of transmission control protocol connections over the communication channel;

wherein determining whether the communication channel is congested as a function of the network traffic flows comprises determining whether the communication channel is congested as a function of at least one of the congestion window sizes or explicit congestion notifications corresponding to the plurality of transmission control protocol connections over the communication channel; and wherein determining whether the communication channel is no longer congested comprises determining whether the communication channel is no longer congested as a function of at least one of the congestion window sizes or explicit congestion notifications corresponding to the plurality of transmission control protocol connections over the communication channel.

17. The method of claim 13, wherein determining whether the communication channel is congested as a function of the plurality of network traffic flows comprises determining whether the communication channel is congested as a function of at least one of (i) a quantity of network packets retransmitted over the communication channel, (ii) a frequency of network packet retransmissions over the communication channel, (iii) a quantity of duplicate acknowledgement packets received over the communication channel, or (iv) a frequency of receiving duplicate network packets over the communication channel.

18. The method of claim 13, further comprising:
receiving, on the network device, a third acknowledgment packet from the another computing device in response to transmitting the stored network packet to the upstream network device;
intercepting, on the network device, the third acknowledgment packet received from the another computing device; and
preventing, on the network device, the computing device from receiving the third acknowledgment packet.

19. The method of claim 13, further comprising:
spoofing, on the network device, a source Internet protocol address of the first acknowledgment packet transmitted to the computing device;
spoofing, on the network device, the source internet protocol address of the second acknowledgment packet transmitted to the upstream network device; and
spoofing, on the network device, the source internet protocol address of the stored network packet transmitted to the upstream network device.

20. One or more non-transitory, machine readable media comprising a plurality of instructions stored thereon that, in response to being executed, cause a network device to:
receive a network packet from a computing device destined for another computing device, wherein the received network packet corresponds to a new network traffic flow of a plurality of network traffic flows over a communication channel established between the network device and an upstream network device;
analyze the plurality of network traffic flows over the communication channel established between the network device and the upstream network device;
determine whether the communication channel is congested as a function of the plurality of network traffic flows;
store the received network packet in a local storage in response to determining that the communication channel is congested;
transmit a first acknowledgment packet to the computing device in response to storing the received network packet in the local storage;
transmit a second acknowledgment packet to the upstream network device in response to storing the received network packet in the local storage;
determine whether the communication channel is no longer congested; and
transmit the stored network packet to the upstream network device in response to determining that the communication channel is no longer congested.

21. The one or more non-transitory, machine readable media of claim 20, wherein to determine whether the communication channel is no longer congested comprises to determine whether the communication channel is no longer congested in response to a lapse of a reference time period.

22. The one or more non-transitory, more machine readable media of claim 20, wherein the plurality of instructions further cause the network device to:
receive a third acknowledgment packet from the another computing device in response to transmitting the stored network packet to the upstream network device;
intercept the third acknowledgment packet from the another computing device; and
prevent the computing device from receiving the third acknowledgment packet.

23. The one or more non-transitory, machine readable media of claim 20, wherein the plurality of instructions further causer the network device:
spoof a source internet protocol address of the first acknowledgment packet transmitted to the computing device;
spoof the source internet protocol address of the second acknowledgment packet transmitted to the upstream network device; and
spoof the source internet protocol address of the stored network packet transmitted to the upstream network device.

* * * * *